United States Patent Office 3,407,230
Patented Oct. 22, 1968

3,407,230
BENZAMIDOALKYLTHIOPSEUDOUREAS
Bernard M. Regan, Chicago, Ill., assignor to Baxter Laboratories, Inc., Morton Grove, Ill., a corporation of Delaware
No Drawing. Continuation-in-part of application Ser. No. 372,673, June 4, 1964. This application Aug. 29, 1967, Ser. No. 663,949
12 Claims. (Cl. 260—558)

ABSTRACT OF THE DISCLOSURE

Compounds of the class benzamidoalkylthiopseudoureas represented by the structure shown in the second paragraph of the specification, useful as local anesthetics, for example, 2(2'-benzamidoethylthio)-1-cyclohexylpseudourea hydrochloride.

---

This is a continuation-in-part of co-pending application Ser. No. 372,673, filed June 4, 1964 now abandoned.

The present invention relates to novel thiopseudoureas and to the method by which they are prepared. More particularly, it relates to the novel benzamidoalkylthiopseudoureas having the general formula

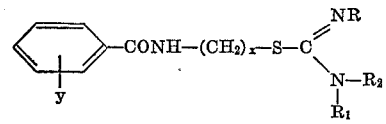

in which $y$ is hydrogen, or a chloride or bromide substituent; $x$ is an integer of from 2 to 3; R is hydrogen or lower alkyl having 1 to 4 carbon atoms; $R_1$ and $R_2$ are hydrogen, lower alkyl having 1 to 4 carbon atoms or cyclohexyl and at least one of R, $R_1$ and $R_2$ are other than hydrogen; and the pharmaceutically acceptable acid salts thereof. Preferably, the sum of the carbon atoms in R, $R_1$ and $R_2$ is at least four.

The novel thiopseudoureas of the present invention generally are more active topically on guinea pig cornea and in guinea pig wheals and generally have better margins of safety than the current drug of choice, lidocaine hydrochloride. As such, the thiopseudoureas of this invention hold good promise as effective and useful agents for inducing local anesthesia in animals.

The novel benzamidoalkylthiopseudoureas of the present invention can be conveniently prepared by reacting a benzamidoalkylhalide with an alkyl thiourea. In the preferred method of the present invention a mixture of a benzamidoalkyl chloride or bromide (0.1 mole), an alkylthiourea (0.1 mole) and ethanol (100 ml.) is heated to boiling (ca. 80° C.) and refluxed for about 5 to about 16 hours. The excess solvent is removed by distillation, the residue is diluted with ethyl acetate or acetone and then the resulting mixture is cooled to precipitate the salts of the benzamidoalkylthiopseudoureas as substantially pure reaction products. If it is so desired, the compounds can be recrystallized from ethanol or methanol and ethyl acetate mixtures or from acetone to further purify them.

The benzamidoalkylhalides contemplated for use in the method of the present invention are compounds having the general formula

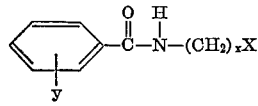

in which $y$ is hydrogen, or a bromide or chloride substituent, X is Br or Cl, and $x$ is 2 or 3. Especially preferred for use in the method of the present invention are the compounds:

benzamidoethylchloride,
benzamidoethylbromide,
benzamidopropylchloride,
bendamidopropylbromide, and
o-chlorobenzamidoethyl chloride The thioureas contemplated for use are those compounds of the formula:

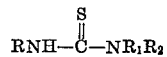

in which R is hydrogen or lower alkyl; $R_1$ and $R_2$ are hydrogen, lower alkyl or cyclohexyl and at least one of R, $R_1$ and $R_2$ are other than hydrogen. Illustrative of such thioureas are 1,3-diisopropyl-2-thiourea;
1-cyclohexyl-2-thiourea;
1-cyclohexyl-3-methyl-2-thiourea;
1-n-butyl-2-thiourea;
1,1-diethyl-2-thiourea; and
1,1-diallyl-2-thiourea.

The novel benzamidoalkylthiopseudoureas of the present invention can be used as local anesthetic agents in the free base form or in the form of pharmaceutically acceptable salts of the free bases. For convenience in administration in aqueous solution, it is preferable to use the salt form of the compounds. The free base form is preferable when it is desired to use the compound in oleaginous pharmaceutical diluents.

The free base form of the benzamidoalkylthiopseudourea can be conveniently prepared by reacting the corresponding salt with an alkaline reagent, for example, sodium carbonate, sodium hydroxide, aqueous ammonia, and other such alkaline reagents commonly used for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, citric, tartaric, lactic, malic, fumaric and the like inorganic and organic acids known to be pharmaceutically acceptable.

The practice of the present invention is further illustrated by reference to the following examples in which all "parts" and "percentages" are "parts" and percentages" by weight unless otherwise indicated.

Example I

A mixture of benzamidoethyl chloride (66 gm., 0.36 mole), 1,3-diisopropyl-2-thiourea (57 gm., 0.35 mole) and ethanol (300 ml.) was heated to boiling and refluxed for five hours. Upon dilution of the residue with ethyl acetate and cooling overnight a 75% yield (92 gm.) of crystalline 2(2'-benzamidoethylthio)-1,3-diisopropylpseudourea hydrochloride, M.P. 181–3° C., was obtained.

*Analysis.*—Calc'd for $C_{16}H_{25}N_3OS \cdot HCl$ (M.W. 343.93); C, 55.88%; H, 7.62%. Found: C, 56.20%; H, 7.51%.

Example II (a) A mixture of benzamidopropyl chloride (197.7 gm., 1 mole), 1-cyclohexyl-2-thiourea (158.3 gm., 1 mole) and isopropanol (600 ml.) was heated to boiling and refluxed for 6.5 hours. Concentration of the reaction mixture by distillation followed by dilution of the residue with acetone gave a yield of 325 gm. of crude 2(3'-benzamidopropylthio)-1-cyclohexylpseudourea by hydrochloride. After further purification by recrystallization from a methanol-ethyl acetate mixture a yield of 280 gm. of the compound with M.P. 161–2° C. was obtained.

*Analysis.*—Calc'd for $C_{17}H_{25}N_3OS \cdot HCl$ (M.W. 355.94): C, 57.36%; H, 7.36%; N, 11.81%; S, 9.01%; Cl, 9.96%. Found: C, 57.36%; H, 7.26%; N, 11.65%; S, 8.90%; Cl, 9.74%.

(b) The above hydrochloride salt of 2(3'-benzamidopropylthio)-1-cyclohexylpseudourea was converted to the free base form of the compound by reaction with sodium carbonate as follows:

A solution of 2(3'-benzamidopropylthio)-1-cyclohexylpseudourea hydrochloride (5 gm., 0.014 mole) in water (150 ml.) was cooled in an ice bath and stirred as a solution of sodium carbonate (1.48 gm., 0.014 mole) in water (25 ml.) was added dropwise. The free base precipitated as a white solid which was collected by filtration, washed with water, and dried in vacuo over potassium hydroxide; M.P. 103–5° C.; wt. 3.1 gm. A sample of the free base was then dried in vacuo over potassium hydroxide at 65° C. for three hours and analyzed.

*Analysis.*—Calc'd for $C_{17}H_{25}N_3OS$: C, 63.91%; H, 7.88%. Found: C, 64.25%; H, 7.84%.

Example III

A mixture of o-chlorobenzamidoethyl chloride (11.0 gm., 0.05 mole), 1,3-diisopropyl-2-thiourea (8.0 gm., 0.05 mole) and ethanol (100 ml.) was heated to boiling and refluxed for five hours. The solvent was removed by distillation and the residue diluted with ethyl acetate. After two recrystallizations from ethanol-ethyl acetate a yield of 14.4 gm. of 2[2'(o-chlorobenzamido)-ethylthio]-1,3-diisopropylpseudourea hydrochloride, M.P. 134–6° C. was obtained.

*Analysis.*—Calc'd for $C_{16}H_{24}ClN_3OS \cdot HCl$ (M.W. 378.38): C, 50.79%; H, 6.66%. Found: C, 50.01%; H, 6.72%.

Example IV

A solution of benzamidoethyl chloride (12.9 gm., 0.07 mole) and 1-cyclohexyl-3-methyl-2-thiourea (12.05 gm., 0.07 mole), M.P. 162–4° C., in 150 ml. of ethanol was refluxed overnight, concentrated and then diluted with ethyl acetate to obtain a crystalline product. Upon recrystallization from ethanol-ethyl acetate a yield of 20.1 gm. (80% yield) of 2(2'-benzamidoethylthio)-1-cyclohexyl-3-methylpseudourea hydrochloride, M.P. 176–8° C., was obtained.

Example V

A solution of benzamidoethyl chloride (9.2 gm., 0.05 mole) and 1,1-diallyl-2-thiourea (7.8 gm., 0.05 mole) in 50 ml. of ethanol was refluxed for eight hours, concentrated and cooled. The solid residue was recrystallized from methanol-ethyl acetate and a yield of 10.8 gm. (63% yield) of 2(2'-benzamidoethylthio)-3,3-diallylpseudourea hydrochloride, M.P. 150–1° C., was obtained.

Employing the methods described in the above examples the following compounds were likewise prepared:

2(2'-benzamidoethylthio)-1,3-diisopropylpseudourea hydrobromide (VI)

2(2'-benzamidoethylthio)-1-cyclohexylpseudourea hydrochloride (VII)

2(2'-benzamidoethylthio)-1-n-butylpseudourea hydrochloride (VIII)

2(2'-benzamidoethylthio)-3,3-diethylpseudourea hydrochloride (IX)

2(3'-benzamidopropylthio)-3,3-diethylpseudourea hydrochloride (X)

2(2'-benzamidoethylthio)-1-methylpseudourea hydrochloride (XI)

2(2'-benzamidoethylthio)-1,3-dimethylpseudourea hydrochloride (XII)

The compounds of Examples I to X were tested for local anesthetic activity on guinea pig cornea using a modified Chance and Lobstein [1] method and intradermally in guinea pig wheals using a modified Bulbring and Wajda [2] method. The lethal doses were measured by intravenous injection in white mice (I.V. $LD_{50}$). The activity and toxicity values presented here are relative values referring to lidocaine hydrochloride as a standard, whose activity and toxicity are both by definition, unity. Thus, a compound is characterized by its relative anesthetic activity, RA, its relative toxicity, RT, and the ratio RA/RT, or anesthetic index, AI. These values are given in Table I.

As can be seen from the table, Compounds I to VIII are all more active topically (RA corneal 3.5, 3.5, 5.4, 5.1, 2.9, 2.3, 3.5, and 1.9, respectively) and intradermally (RA 2.8, 2.8, 2.0, 3.9, 1.1, 1.4, 3.1, and 1.7, respectively) than lidocaine (RA 1.0). On the other hand, Compounds I, III, IV and V are more toxic (RT 1.5, 1.7, 1.3, and 1.5, respectively) than lidocaine (RT 1.0), whereas Compounds II and VI are equivalent (RT 1.0) to lidocaine in toxicity. The anesthetic indicies (RA/RT) of Compounds I–X topically (AI corneal 2.3, 3.5, 3.2, 3.9, 1.9, 2.3, 3.9, 2.1, 1.2, and 1.5, respectively) and Compounds I–IV and VI–X intradermally (AI 1.9, 2.8, 1.2, 3.0, 1.4, 3.4, 1.9, 1.3, and 1.3, respectively) are superior to those of lidocaine (AI 1.0). Consequently, all of Compounds I–X have a greater margin of safety than lidocaine with the exception of Compound V which is better than lidocaine when tested topically but not when tested intradermally. Compound V, however, is significantly and substantially more potent than lidocaine.

TABLE I

| Compound | $EC_{50}$ [1] mg./ml. | | RA | | $LD_{50}$ mg./kg., I.V. | RT, I.V. | AI=RA/RT | |
|---|---|---|---|---|---|---|---|---|
| | Corneal | I.D. | Corneal | I.D. | | | Corneal | I.D. |
| Lidocaine HCl | 9.2 | 0.74 | 1.0 | 1.0 | 32 | 1.0 | 1.0 | 1.0 |
| I | 2.6 | 0.26 | 3.5 | 2.8 | 21 | 1.5 | 2.3 | 1.9 |
| II | 2.6 | 0.26 | 3.5 | 2.8 | 31 | 1.0 | 3.5 | 2.8 |
| III | 1.7 | 0.37 | 5.4 | 2.0 | 19 | 1.7 | 3.2 | 1.2 |
| IV | 1.8 | 0.19 | 5.1 | 3.9 | 25 | 1.3 | 3.9 | 3.0 |
| V | 3.2 | 0.70 | 2.9 | 1.1 | 22 | 1.5 | 1.9 | 0.7 |
| VI | 4.0 | 0.52 | 2.3 | 1.4 | 33 | 1.0 | 2.3 | 1.4 |
| VII | 2.6 | 0.24 | 3.5 | 3.1 | 36 | 0.9 | 3.9 | 3.4 |
| VIII | 4.8 | 0.44 | 1.9 | 1.7 | 35 | 0.9 | 2.1 | 1.9 |
| IX | 13 | 0.91 | 0.71 | 0.8 | 51 | 0.6 | 1.2 | 1.3 |
| X | 10 | 0.98 | 0.92 | 0.8 | 50 | 0.6 | 1.5 | 1.3 |

[1] Effective concentration which anesthetized 50% of the test animals.

From the foregoing table it appears that the novel compounds of the present invention in which the sum of the carbon atoms in R, $R_1$ and $R_2$ is at least four more closely approach the ideal local anesthetic agent than any of the compounds previously known.

The compounds of Examples XI and XII were similarly tested for local anesthetic activity intradermally in guinea pig wheals as above and compared with the compound 2(2'-benzamindoethylthio)-pseudourea hydrochloride which has no alkyl groups bonded to any of the nitrogens in the thiopseudourea moiety. In this comparison it was found that Compounds XI and XII had margins of safety (AI=RA/RT) of 1.2 and 1.4, respectively, relative to the margin of safety of 1.0 of the compound 2(2'-benzamidoethylthio)-pseudourea hydrochloride.

---

[1] Chance and Lobstein, J. Pharmacal. and Exper. Therap., 82, 203 (1944).
[2] Bulbring and Wajda, Ibid., 85, 78 (1945).

The compounds of the present invention can be readily prepared for pharmaceutical use by combining them with suitable pharmaceutical diluents to form ointments aerosol sprays, solutions and the like.

While in the above examples specific reagents have been used to serve as solvents and the like, it will be readily understood by those skilled in the art that the scope of the present invention is not limited to the use of such reagents and that trial testing or reference to suitable commercial property tables can be employed to find suitable equivalents to the named solvents.

It will also be readily apparent to those skilled in the art that still other minor changes can be made without departing from the spirit and scope of the present invention.

What is claimed is:

1. A benzamidoalkylthiopseudourea having the formula:

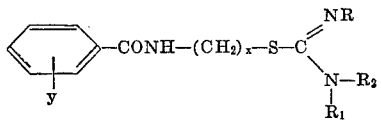

in which $y$ is hydrogen, or a chloride or bromide substituent; $x$ is an integer of from 2 to 3; R is hydrogen or lower alkyl of 1 to 4 carbon atoms, $R_1$ and $R_2$ are hydrogen, lower alkyl of 1 to 4 carbon atoms or cyclohexyl and at least one of R, $R_1$ and $R_2$ are other than hydrogen; and a pharmaceutically acceptable acid salt thereof.

2. The benzamidoalkylthiopseudoureas of claim 1 in which the sum of the carbon atoms in R, $R_1$ and $R_2$ is at least four.

3. The compound of claim 1 in which the benzamidoalkylthiopseudourea is 2(2′-benzamidoethylthio)-1,3-diisopropylpseudourea hydrobromide.

4. The compound of claim 1 in which the benzamidoalkylthiopseudourea is 2(2′-benzamidoethylthio)-1,3-diisopropylpseudourea hydrochloride.

5. The compound of claim 1 in which the benzamidoalkylthiopseudourea is 2(3′-benzamidopropylthio)-1-cyclohexylpseudourea hydrochloride.

6. The compound of claim 1 in which the benzamidoalkylthiopseudourea is 2[2′(o - chlorobenzamido) - ethylthiol]-1,3-diisopropylpseudourea hydrochloride.

7. The compound of claim 1 in which the benzamidoalkylthiopseudourea is 2(2′-benzamidoethylthio)-1-cyclohexylpseudourea hydrochloride.

8. The compound of claim 1 in which the benzamidoalkylthiopseudourea is 2(2′-benzamidoethylthio)-1-cyclohexyl-3-methylpseudourea hydrochloride.

9. The compound of claim 1 in which the benzamidoalkylthiopseudourea is 2(2′-benzamidoethylthio)-1-n-butyl-pseudourea hydrochloride.

10. The compound of claim 1 in which the benzamidoalkylthiopseudourea is 2(2′-benzamidoethylthio)-3,3-diethylpseudourea hydrochloride.

11. The compound of claim 1 in which the benzamidoalkylthiopseudourea is 2(3′-benzamidopropylthio)-3,3-diethylpseudourea hydrochloride.

12. The compound of claim 1 in which the benzamidoalkylthiopseudourea is 2(2′-benzamidoethylthio)-3,3-diallylpseudourea hydrochloride.

References Cited

Stirling: Jour. Chem. Soc. (London) 1958, pp. 4524–30.

J. PATTEN, *Primary Examiner.*

N. TROUSOF, *Assistant Examiner.*